United States Patent

Purnell

[11] Patent Number: 5,581,843
[45] Date of Patent: Dec. 10, 1996

[54] WHEEL ASSEMBLY FOR BABY STROLLER

[76] Inventor: Peter F. Purnell, 7 Deer La., Ledyard, Conn. 06339

[21] Appl. No.: 514,596
[22] Filed: Aug. 14, 1995
[51] Int. Cl.$^6$ .................................................. B60B 33/02
[52] U.S. Cl. .......................... 16/35 R; 16/44; 280/47.38
[58] Field of Search ..................... 16/35 R, 44; 280/642, 280/647, 650, 47.38, 47.4

[56] References Cited

U.S. PATENT DOCUMENTS

| | | | |
|---|---|---|---|
| 2,410,570 | 11/1946 | Davis | 9/1 |
| 2,494,144 | 1/1950 | Restall | 280/124 |
| 2,549,320 | 4/1951 | Makin | 267/20 |
| 2,582,716 | 1/1952 | Nelson | 16/44 |
| 2,631,842 | 3/1953 | Oppenfander et al. | 267/11 |
| 2,707,795 | 5/1955 | Skupas | 16/44 |
| 2,738,542 | 3/1956 | Clark, Jr. | 16/44 |
| 2,815,961 | 12/1957 | Brueder | 280/124 |
| 2,885,720 | 5/1959 | Seeberger | 16/44 |
| 2,957,708 | 10/1960 | Hersey et al. | 280/124 |
| 3,014,713 | 12/1961 | Fenton | 267/60 |
| 3,216,740 | 11/1965 | Perás | 280/124 |
| 3,246,718 | 4/1966 | Kozicki | 180/73 |
| 3,387,857 | 6/1968 | Roberts | 280/140.5 |
| 3,594,017 | 7/1971 | Grosseaw | 280/124 |
| 4,344,643 | 8/1982 | Ray | 280/724 |
| 4,566,717 | 1/1986 | Arthur et al. | 280/701 |
| 4,608,729 | 9/1986 | Huang | 16/44 X |
| 4,731,899 | 3/1988 | Huang | 16/35 R |
| 4,773,124 | 9/1988 | Nakao et al. | 16/35 R |
| 4,831,689 | 5/1989 | Lo | 16/35 R |
| 4,847,945 | 7/1989 | Schwartz et al. | 16/44 X |
| 4,913,452 | 4/1990 | Zuh | 16/35 R X |
| 5,103,530 | 4/1992 | Andrisin et al. | 16/44 X |
| 5,351,364 | 10/1994 | Zuh | 16/44 X |

Primary Examiner—Brian L. Johnson
Assistant Examiner—Michael Mar
Attorney, Agent, or Firm—J. F. McLellan

[57] ABSTRACT

A wheel assembly for a baby stroller in which the wheel or wheels are mounted to the trailing portion of a linkage assembly that is pivotally carried at its midportion by a lower support. The leading portion of the linkage assembly is located ahead of the wheels and is connected by a tension spring to an upper support. Upward travel of the wheels is resisted by extension of the spring. The lower support mounts a lock movable into lock and release positions. In the lock position the lower support is prevented from rotating about a vertical axis relative to the upper support. In the release position such rotation can occur. Consequently, the baby stroller can be turned around and pushed in a direction opposite the original direction of travel once the wheel assemblies are properly oriented.

10 Claims, 2 Drawing Sheets

WHEEL ASSEMBLY FOR BABY STROLLER

BACKGROUND OF THE INVENTION

1. Field of the Invention

The present invention relates to a wheel assembly adapted for attachment to the frame of a baby stroller.

DESCRIPTION OF THE PRIOR ART

The present invention is particularly useful in connection with a type of baby stroller having four dual wheel assemblies at its corners. Typically, each of the wheel assemblies can castor or swivel about a vertical axis, the two front assemblies being freely castorable to permit the stroller to be turned easily. The rear assemblies are locked against swiveling to make it easier to steer the stroller along a straight path.

The handle for pushing such a stroller is pivotable about a horizontal axis to move its free end from one end of the stroller to the other. This permits the stroller to be turned around and pushed from its opposite end. The baby in the stroller will then face in the opposite direction without changing his or her position in the stroller.

Once the stroller is turned around, the formerly rearwardly locked wheel assemblies should be unlocked for free castoring, and the formerly forwardly located wheel assemblies should be locked against castoring.

It is therefore desirable that the wheel assemblies be capable of easy and rapid adjustment to convert them from a castoring to a non-castoring condition.

Many prior art strollers have no provision for absorbing road shock. Even in those cases where some shock absorption capability is provided, it usually takes the form of springs between the frame and the wheels that tend to rock the complete frame backward and forward. In other strollers where the wheels are independently sprung, each wheel can individually react to the shock of a bump. However, the shock absorber at each wheel assembly is normally a compression spring or hydraulic cylinder. Such a device cushions movement upwardly and downwardly, but it is incapable of allowing the wheels to yield rearwardly to cushion shocks resulting from contact with the vertical surfaces of curbs, steps, or similar obstructions.

Accordingly, it is desirable for baby stroller wheels to be independently sprung, and not only deflect upwardly, but also rearwardly in order to smoothly negotiate the vertical or near vertical surfaces of bumps and other road irregularities.

SUMMARY OF THE INVENTION

According to the present invention, each of the four dual wheel assemblies at the corners of a baby stroller frame comprise an upper support fixedly coupled to the frame, and a lower support located below and aligned with the upper support along a substantially vertical axis. The dual wheels are mounted to the trailing portion of an elongated linkage assembly whose midportion is pivotally carded by the lower support.

The opposite or leading portion of the linkage assembly is connected to the upper support by a tension spring or the like which resiliently resists upward movement of the wheels at the trailing end of the linkage assembly.

The wheel carrying lower support mounts a lock that is movable to a lock position. In this position stops or tabs on the upper support are engaged to prevent rotation of the lower support relative to the upper support. Locking the rear wheel assemblies against rotation prevents castoring of the rear wheels, and thereby facilitates travel of the stroller along a straight path.

The lock is selectively movable to a release position for unlocking the front wheel assemblies to permit them to freely castor for better steering of the front end of the stroller.

The foregoing location of the locks is reversible to allow the stroller to be pushed from its opposite end. Depending upon the orientation of the stroller, the baby can be faced forwardly or rearwardly.

Each wheel assembly includes means for attaching the lock to the lower support so that the lock is vertically slidable and temporarily fixable in position for releasably engaging or disengaging the stops on the upper support.

The lower support transmits the stroller load to the linkage assembly. Accordingly, with the wheels mounted to the linkage assembly in trailing relation to the lower support, the wheels will move rearwardly as well as upwardly when a bump is struck, and the tension spring will cushion both the upward and rearward forces which occur when the wheels encounter the bump.

Other objects and features of the invention will become apparent from the following more detailed description taken in conjunction with the accompanying drawings.

BRIEF DESCRIPTION OF THE DRAWINGS

FIG. 7 is a partially schematic view of the wheel assembly negotiating a bump in a sidewalk or the like.

DESCRIPTION OF THE PREFERRED EMBODIMENTS

Figure 1:
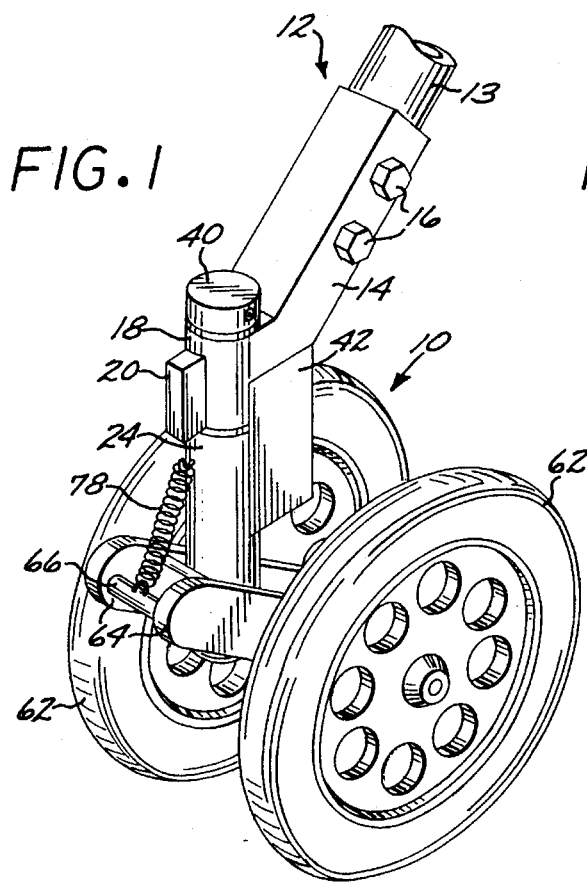
FIG. 1 is a perspective view of a wheel assembly according to the present invention, the wheel assembly being illustrated as it would appear when mounted to a baby stroller frame.

Referring now to FIGS. 1–4, a wheel assembly 10 is illustrated as it would appear when mounted to a baby stroller frame 12. Four such assemblies are mounted at the four corners, respectively, of the stroller frame 12. Four tubular frame struts 13, only one of which is illustrated, form part of the frame 12.

Each wheel assembly is attached to the stroller 12 by a support means which includes a downwardly and forwardly disposed support strut 14 having an open upper end which receives the associated strut 13. The strut 13 is fixed to the strut 14 by a pair of bolt assemblies 16.

Each support means also includes a cylindrical, centrally bored, and vertically oriented upper support 18 whose upper extremity is unitary or integral with the lower extremity of the strut 14. The support further includes a forward tab or stop 20 integral with the front surface of the support 18, and a rearward tab or stop 22 integral with the rearward surface of the support 18. As will be seen, these components cooperate with other structure to prevent castoring, swiveling or rotation of the wheel assembly about a vertical axis.

The support means which includes the upper support 18 also includes a cylindrical, open ended, and vertically oriented lower support 24 of approximately the same diameter as the upper support 18. The support 24 is not unitary with the support 18, instead forming a downward, vertically aligned continuation of the support 18.

Figure 5:
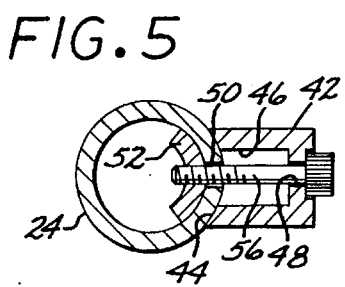
FIG. 5 is an enlarged detail view taken along the line 5—5 of FIG. 3;0
Figure 7:
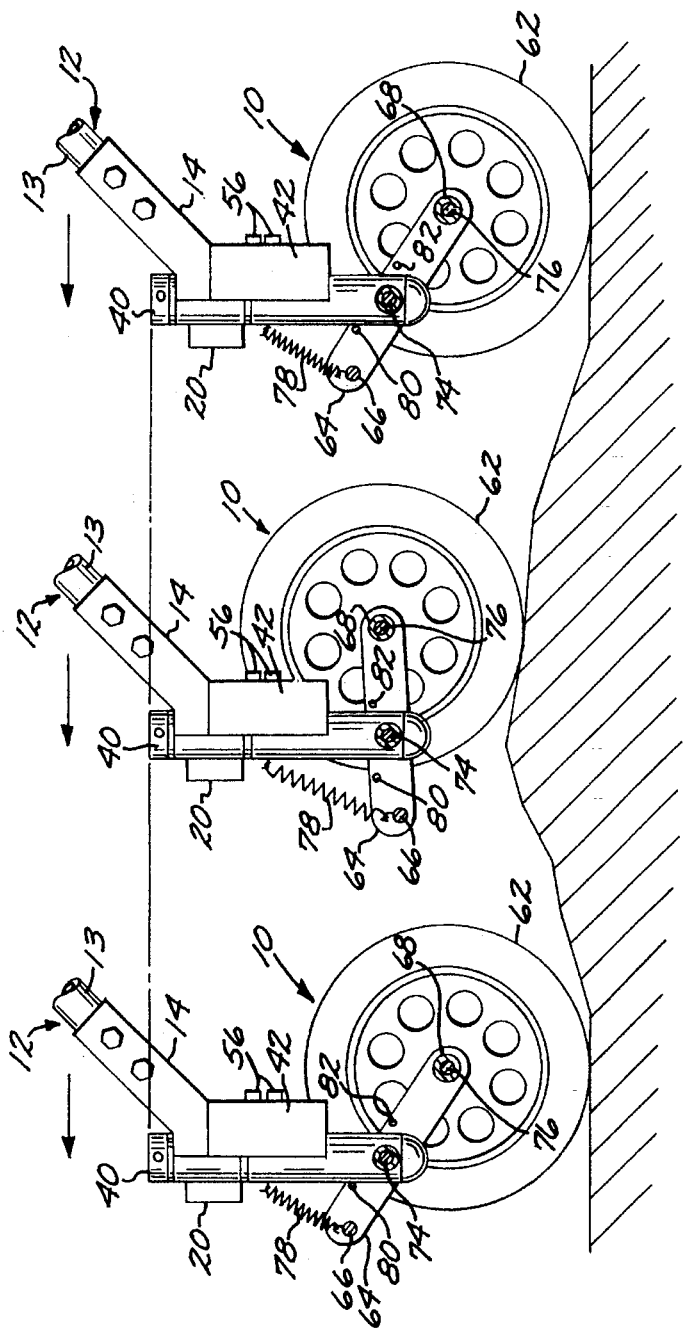
Figure 6:
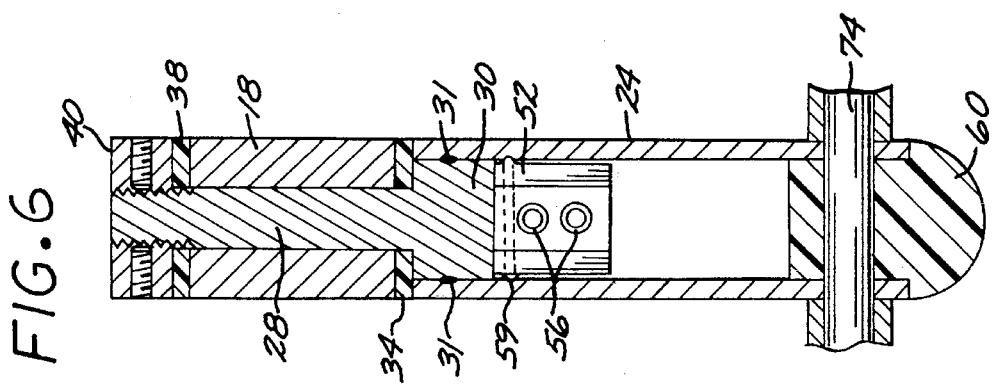
FIG. 6 is an enlarged rear elevational view of the support means for attaching the wheel assembly to the baby stroller frame, and for supporting the link arm assembly that carries the wheels.

As best seen in FIGS. 5 and 6, the lower support 24 is rotatable relative to the upper support 18 about a generally vertical axis that is coincident with the centerlines of both of the supports 18 and 24.

The mounting means for rotatably mounting the lower support 24 to the upper support 18 includes a vertically oriented mounting shaft 28 having a cylindrical lower end or base 30 larger in diameter than the shaft 28.

The upper end of the shaft 28 extends through the central bore of the upper support 18, while the base 30 is fitted within the lower support flush with the upper end. The base 30 is fixed in position by any suitable means, such as by set screws or by spot welds 31.

A washer 34 is fitted onto the shaft 28 between the adjacent surfaces of the upper and lower supports 18 and 24. The washer 34 is made of a low friction material such as tetrafluoroethylene or the like to facilitate relative rotation between the upper and lower supports. A similar washer 38 is fitted onto the upper end of the shaft 28 in engagement with the upper end of the upper support 18.

A centrally apertured cap 40 is slipped onto the upper end of the shaft 28 in contact with the washer 38, where it is secured in position by a pair of set screws 41 that fit within oppositely located, threaded openings in the cap 40. The heads of the set screws 41 fit within counterbores in the cap 40, and are adapted to be turned by an Allen wrench or the like to seat their inner ends within blind bores provided in the shaft 28.

Figure 4:
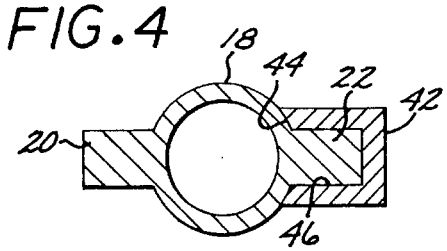
FIG. 4 is an enlarged detail view taken along the line 4—4 of FIG. 2.

The lower support 24 is selectively locked against rotation relative to the upper support 18 by a releasable lock means which operates in conjunction with the stops 20 and 22. The lock means, as best seen in FIGS. 4 and 5, comprises a slidable lock 42 having an arcuate face 44 that is vertically slidable over the rounded outer surface of the lower support 24.

The lock 42 has a slot 46 in its upper end to receive one of the forward or rearward stops 20 or 22, depending upon the desired orientation of the lower support 24 relative to the upper support 18.

Figure 3:
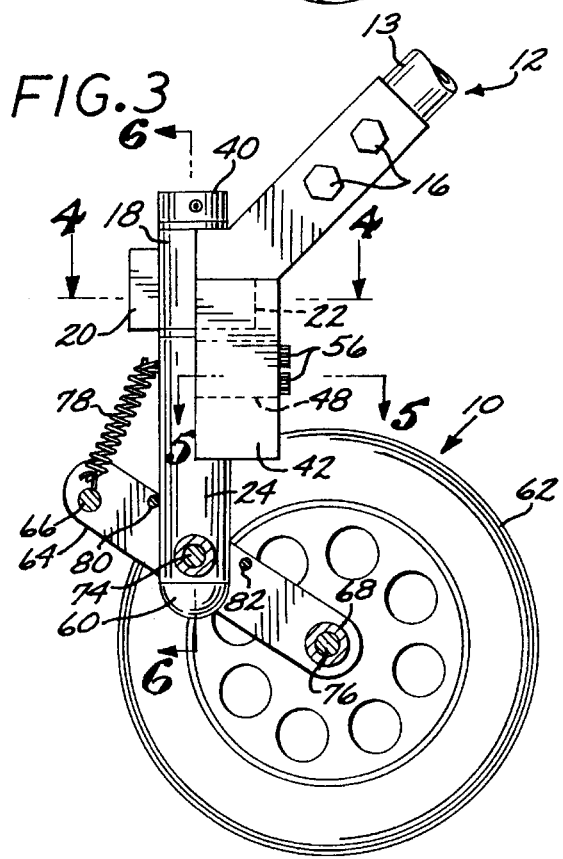
FIG. 3 is a view taken along the line 3—3 of FIG. 2.

The lock 42 also includes a pair of vertically spaced apart openings 48 which are transversely or horizontally oriented, as seen in dotted outline in FIG. 3. The openings 48 are transversely aligned with a vertical slot 50 provided in the lower support 24.

The lock 42 is clamped in position by holding means such as a pair of lock elements or machine screws 56 having threaded ends which pass through the holes 48 in the lock, through the slot 50 in the lower support, and into a pair of threaded holes provided in an arcuate retainer or anchor plate 52 inside the lower support.

The arcuate surface of the plate 52, as seen in FIG. 6, is slidable through the open lower end of the lower support 24 until its threaded holes are aligned with the slot 48.

The machine screws 56 include heads adapted to be turned by an Allen wrench or the like, with the heads fitting within counterbores provided in the lock 42.

When the screws 56 are properly tightened, the arcuate surface of the lock 42 is slidable over the cylindrical inner surface of the lower support 24 between the up or locked position illustrated in FIG. 6 and a down or release position. These positions correspond, respectively, with engagement and nonengagement with one of the stop tabs 20 or 22, respectively.

The freely slidable movement makes it easy for the user of the stroller to locate the lock in a desired position. If the lock is moved to a down position, it will stay there of its own weight. If it is moved to an up position, it is held there by reception of an arcuate bead or ridge 59 within an interior complemental groove provided in the interior wall of the lower support. The ridge and groove are sized such that the lock will stay in the up position, but it is easily movable downwardly by firmly pulling it downwardly.

A cap 60 is fitted onto the open lower end of the lower support 24 to seal out dig and dust. The cap 60 includes a smaller diameter cylindrical portion which extends into the support 24, as seen in FIG. 6. As will be seen, the cap 60 also supports structure associated with a linkage assembly.

Figure 2:
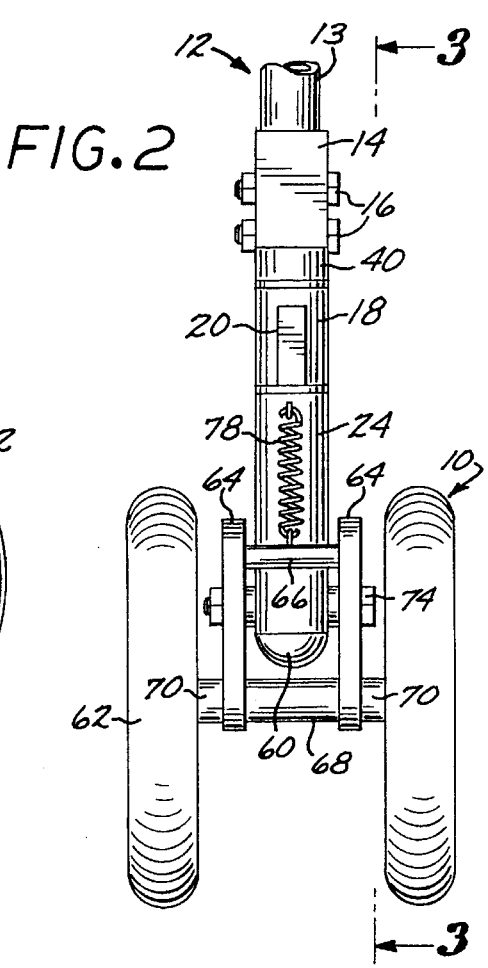
FIG. 2 is a front elevational view of the wheel assembly of FIG. 1.

The linkage assembly comprises a pair of upwardly and forwardly inclined link arms 64 located on either side of the lower support 24. Both the support 24 and the link arms 64 are located between a pair of wheels 62, as best seen in FIGS. 1 and 2. The wheels are preferably of a generous diameter, such as about eight inches, so that they can easily negotiate relatively large bumps.

The link arms 64 are fixed together in spaced, parallel relation at their forward and rearward extremities by a pair of cylindrical elements 66 and 68, respectively, that are spot welded or otherwise fastened to the link arms.

A pair of stop pins 80 and 82 are fixed to the mid portions of the link arms to limit upward and downward movement of the wheels 62, as will be seen.

The linkage assembly is pivotally supported by a support axle 74 that extends through openings in the lower support 24 and in the mid portions of the link arms 64. The axle 74 takes the form of a headed bolt which passes through cylindrical spacers located between the lower support and the link arms 64, the head end of the bolt engaging one of the link arms, and the threaded bolt end being secured by a nut which engages the other link arm.

The wheels 62 are rotatably mounted on a wheel axle 76 that extends through the cylindrical element 68 which connects together the trailing extremities of the link arms, and through a pair of cylindrical spacers located between the wheels and the link arms, respectively.

A bias means such as a tension spring 78 biases or urges the wheels 62 downwardly. The spring is a progressive rate spring such that its resistance to extension increases in proportion to the weight of the stroller and its contents.

The spring is attached to the element 66 at the forward end of the link arms 64, and to a hook located on the forward surface of the upper extremity of the lower support 24. The location of the spring 78 causes it to pull up on the forward ends of the link arms thereby urging the wheels 62 downwardly to resiliently support the stroller and its contents.

The extent of vertical travel of the wheels 62 relative to the lower support 24 is limited by travel stop means attached to the link arms. The stop means includes a downward travel stop or pin 80 fixed to and extending between the link arms 64 at a point located forwardly of the support axle 74. An upward travel stop or pin 82 is similarly fixed to and extends between the link arms 64 rearwardly of the support axle 74.

Normally the range of travel of the wheels upwardly and downwardly is such that the pins 80 and 82 do not engage the surfaces of the lower support 24. However, when the wheels are moved upwardly beyond a certain point, as when encountering a large bump, the upper travel stop pin 82 engages the rearward surface of the lower support and stops further upward travel of the wheels.

Similarly, when the wheels are drawn downwardly by the bias of the spring 78 after encountering such a large bump, their downward travel is limited by engagement of the lower travel stop pin 80 with the forward surface of the lower support 24.

In operation, assuming a baby in the stroller is facing rearwardly, the stroller handle (not shown) can be located rearwardly for pushing the stroller with the person pushing the stroller facing the baby. In this situation each pair of wheels 62 trails its associated support axle.

The locks 42 on the front wheel assemblies will be located in down positions to enable the front wheels to freely castor for easy steering. The locks 42 on the rear wheels will be located upwardly, and held in position by seating of the ridge 59 within the groove in the lower support 24, to lock the rear wheels against castoring and thereby facilitate steering of the stroller along a straight path.

If it is desired to have the baby face forwardly, the stroller handle (not shown) is reversed in position, and the stroller is turned around. In this position of the stroller the front wheel assemblies should castor and the rear wheels should not. This is easily accomplished by sliding the front assembly wheel locks downwardly until their ridges 59 are moved out of the grooves in the lower supports. Conversely, the rear wheel assembly locks are moved upwardly to seat their ridges in the grooves in the lower support, thereby retaining the locks in their upper, locked positions to prevent castoring of the rear wheels.

From the foregoing description it will be apparent that the trailing position of the wheel axles relative to the support axles enables the wheels to move smoothly upwardly and rearwardly to resiliently respond to bumps. Both vertical and horizontal forces are damped by relatively inexpensive tension springs 78.

While particular embodiments of the invention have been disclosed, it will be apparent that various modifications and changes can be made without departing from the spirit and scope of the invention.

What is claimed is:

1. A baby stroller wheel assembly adapted for attachment to a baby stroller frame, the wheel assembly comprising:

support means adapted for attachment to a baby stroller frame, the support means including an upper support having opposed forward stop means and rearward stop means integral therewith;

a lower support;

mounting means mounting the lower support to the upper support for rotatable movement of the lower support about a generally vertically oriented axis;

releasable lock means on the lower support movable generally parallel to the axis, the lock means having a recess which is adapted in a lock position to selectively receive one of the forward and rearward stop means for coupling the lower support with the upper support to prevent rotatable movement of the lower support, the lock means being adapted in a release position to permit rotatable movement of the lower support;

a pair of elongated link arms located on opposite sides of the lower support, each of the link arms having a midportion, a forward extremity and a rearward extremity;

a support axle extending through the lower support and coupled to the mid portions of the pair of link arms and enabling the lower support to pivotally support the pair of link arms;

a wheel axle extending between and carried by the rearward extremities of the link arms;

a pair of wheels located outwardly of the pair of link arms, respectively, and rotatably supported by the wheel axle; and tension spring means coupled to the forward extremities of the link arms and to the lower support, the tension spring means thereby being rotatable in common with the link arms and the lower support in the release position of the lock means, the tension spring means being operative to bias the forward extremities upwardly and the wheels downwardly.

2. A baby stroller wheel assembly adapted for attachment to a baby stroller frame, the wheel assembly comprising:

support means adapted for attachment to a baby stroller frame, the support means including an upper support, having opposed forward stop means and rearward stop means integral therewith;

a lower support;

mounting means mounting the lower support to the upper support for rotatable movement of the lower support about a generally vertically oriented axis;

releasable lock means slidably mounted on the lower support, the lock means having a recess which is adapted in a lock position to selectively receive one of the forward and rearward stop means for coupling the lower support with the upper support to prevent rotatable movement of the lower support, the lock means being adapted in a release position to permit rotatable movement of the lower support;

a pair of elongated link arms located on opposite sides of the lower support, each of the link arms having a midportion, a forward extremity and a rearward extremity;

a support axle extending through the lower support and coupled to the mid portions of the pair of link arms and enabling the lower support to pivotally support the pair of link arms;

a wheel axle extending between and carried by the rearward extremities of the link arms;

a pair of wheels located outwardly of the pair of link arms, respectively, and rotatably supported by the wheel axle; and bias means coupled to the forward extremities of the link arms and to the lower support, the bias means thereby being rotatable in common with the link arms and the lower support in the release position of the lock means, the bias means being operative to bias the forward extremities upwardly and the wheels downwardly.

3. A baby stroller wheel assembly according to claim 2 wherein the upper and lower supports are cylindrical;

wherein the mounting means includes holding means located within the interior of the lower support, and assembly means extending into the lower support for engagement with the holding means, the assembly means being selectively operable in one mode to cooperate with the holding means to constrain the lower support against rotation, and in another mode to cooperate with the holding means to allow the lower support to rotate relative to the upper support; and low friction means interposed between adjacent portions of the upper and lower supports to facilitate rotation of the lower support relative to the upper support.

4. A baby stroller wheel assembly according to claim 2 wherein the upper and lower supports are generally vertically oriented.

5. A baby stroller wheel assembly according to claim 2 wherein the bias means comprise tension spring means.

6. A baby stroller wheel assembly according to claim 2 wherein the link arms include downward travel stop means located on the forward side of the support axle, and upward travel stop means located on the rearward side of the support axle for engagement with forward and rearward surfaces of the lower support, respectively, to limit downward and upward travel, respectively, of the wheels relative to the lower support.

7. A baby stroller wheel assembly adapted for attachment to a baby stroller frame, the wheel assembly comprising:

support means adapted for attachment to a baby stroller frame, the support structure including an upper support, forward stop means, and rearward stop means;

a cylindrical lower support having a slot;

mounting means mounting the lower support to the upper support for rotatable movement of the lower support about a generally vertically oriented axis, the mounting means including a holding means;

releasable lock means carried by the lower support and adapted in a lock position to couple the lower support with one of the forward and rearward stop means to prevent rotatable movement of the lower support, the lock means being adapted in a release position to permit rotatable movement of the lower support, the releasable lock means comprising a lock having first opening means and a surface in slidable engagement with the outer surface of the lower support;

a pair of elongated link arms located on opposite sides of the lower support, each of the link arms having a midportion, a forward extremity and a rearward extremity;

a support axle extending through the lower support and coupled to the mid portions of the pair of link arms and enabling the lower support to pivotally support the pair of link arms;

a wheel axle extending between and carried by the rearward extremities of the link arm;

a pair of wheels located outwardly of the pair of link arms, respectively, and rotatably supported by the wheel axle;

bias means coupled to the forward extremities of the link arms and to the lower support, and biasing the forward extremities upwardly and the wheels downwardly; and the holding means comprising an anchor member having second opening means aligned with the first opening means and the slot, the anchor member having a surface in slidable engagement with the inner surface of the lower support, and fastener means disposed through the first and second opening means and the slot, and selectively actuable to clamp the lock to the lower support in either a release position out of engagement with both the forward and rearward stop means, or a locking position in engagement with one of the forward and rearward stop means.

8. A baby stroller wheel assembly adapted for attachment to a baby stroller frame, the wheel assembly comprising:

support means adapted for attachment to a baby stroller frame, the support means including a cylindrical, open-ended upper support having opposed forward stop means and rearward stop means integral therewith;

a cylindrical upwardly open lower support;

mounting means mounting the lower support to the upper support for rotatable movement of the lower support about a generally vertically oriented axis, the mounting means including an elongated mounting element extending through the upper support, and having a base fitted into the open upper end of the lower support; a cap releasably attached to the upper end of the mounting element; a first low friction means interposed between the cap and the upper end of the upper support; and a second low friction means interposed between the lower end of the upper support and the base;

releasable lock means slidably mounted on the lower support, the lock means having a recess which is adapted in a lock position to selectively receive one of the forward and rearward stop means for coupling the lower support with the upper support to prevent rotatable movement of the lower support, the lock means being adapted in a release position to permit rotatable movement of the lower support;

a pair of elongated link arms located on opposite sides of the lower support, each of the link arms having a midportion, a forward extremity and a rearward extremity;

a support axle extending through the lower support and coupled to the mid portions of the pair of arms and enabling the lower support to pivotally support the pair of link arms;

a wheel axle extending between and carried by the rearward extremities of the link arms; a pair of wheels located outwardly of the pair of link arms, respectively, and rotatably supported by the wheel axle; and bias means coupled to the forward extremities of the link arms and to the lower support, the bias means thereby being rotatable in common with the link arms and the lower support in the release position of the lock means, the bias means being operative to bias the forward extremities upwardly and the wheels downwardly.

9. A baby stroller wheel assembly according to claim 8 wherein the bias means is coupled to the forward extremity of the linkage means in advance of the location of the wheel axle.

10. A baby stroller wheel assembly according to claim 8 wherein the bias means comprises at least one tension spring.

* * * * *